United States Patent
Huang et al.

(10) Patent No.: US 12,493,379 B2
(45) Date of Patent: Dec. 9, 2025

(54) TOUCH DETECTION METHOD

(71) Applicant: NOVATEK Microelectronics Corp., Hsinchu (TW)

(72) Inventors: Pei-Hsin Huang, Hsinchu County (TW); Yun-Hsiang Yeh, Hsinchu (TW); Yuan-Fu Hsueh, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 3 days.

(21) Appl. No.: 18/429,399

(22) Filed: Jan. 31, 2024

(65) Prior Publication Data
US 2025/0244845 A1 Jul. 31, 2025

(51) Int. Cl.
*G06F 3/041* (2006.01)

(52) U.S. Cl.
CPC ........ *G06F 3/0418* (2013.01); *G06F 3/04166* (2019.05)

(58) Field of Classification Search
None
See application file for complete search history.

(56) References Cited

U.S. PATENT DOCUMENTS

| 10,061,449 B2 * | 8/2018 | Pant | G06F 3/041661 |
| 2013/0215049 A1 * | 8/2013 | Lee | G06F 3/041 345/173 |
| 2021/0333974 A1 * | 10/2021 | Chen | G06F 3/0446 |

FOREIGN PATENT DOCUMENTS

TW 202117506 A 5/2021

* cited by examiner

*Primary Examiner* — Matthew Yeung
(74) *Attorney, Agent, or Firm* — CKC & Partners Co., LLC

(57) ABSTRACT

A touch detection method, suitable for a touch display panel including touch sensing columns, includes following steps. The touch sensing columns are grouped in a first order during a first frame. The touch sensing columns grouped in the first order are scanned for detecting a first touched column during the first frame. The touch sensing columns are grouped in a second order during a second frame. The second order is assigned according to the first touched column. The first touched column and adjacent columns next to the first touched column are grouped together in one group in the second order. The touch sensing columns grouped in the second order are scanned for detecting a second touched column during the second frame.

15 Claims, 9 Drawing Sheets

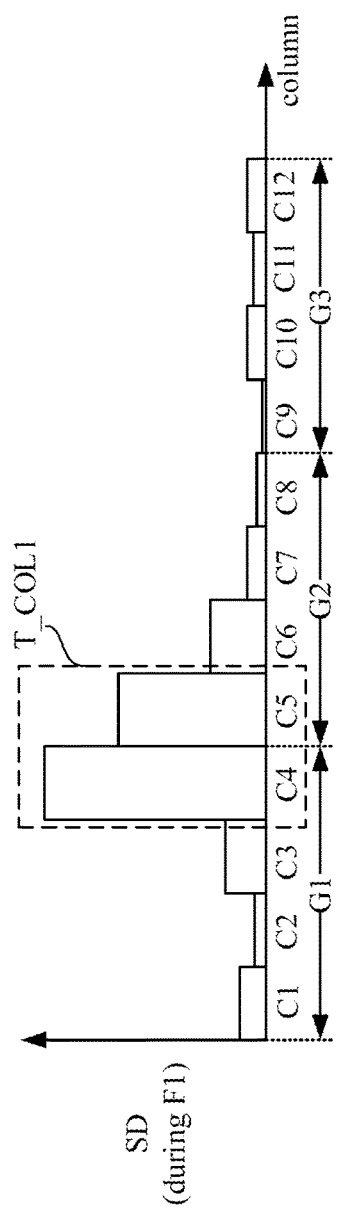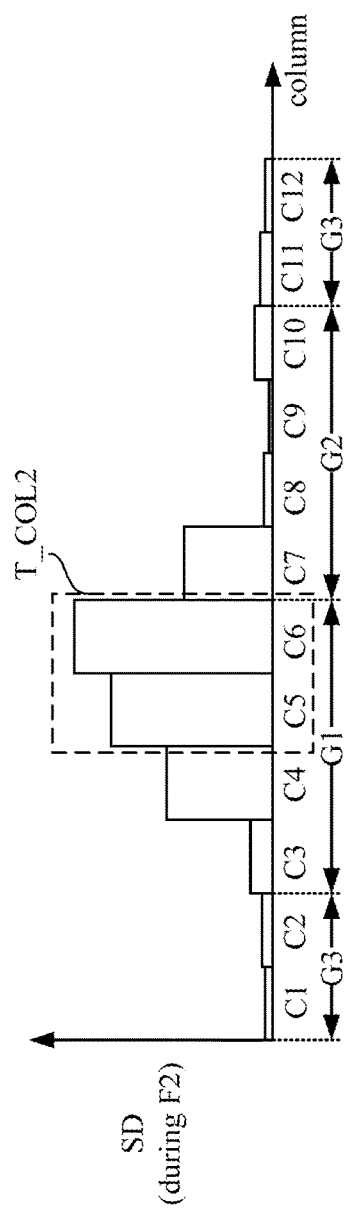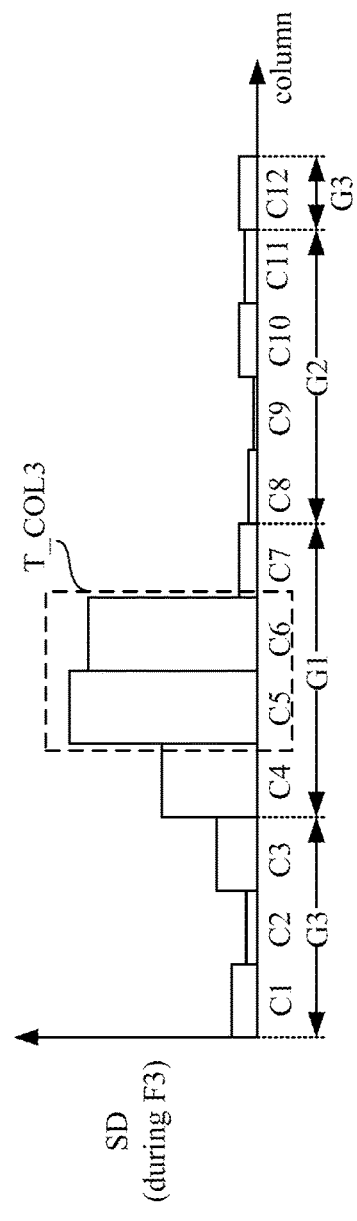

TOUCH DETECTION METHOD

BACKGROUND

Field of Invention

The disclosure relates to a touch detection method. More particularly, the disclosure relates to a touch detection method with resistance against a background noise.

Description of Related Art

Touch display panels have been widely used in a variety of electronic devices in modern technology, such as smart phone, tablet computer, smart television, personal computer, and so on. A conventional touch display panel required a display driver for displaying function and a touch driver for touch detection function. With the development of touch and display driver Integration (TDDI) technology, touch and display functions may be integrated in one chip to drive a touch display panel which is a display panel with integrated touch sensing capability. The TDDI technology may provide advantages including cost reduction, a thinner touch display panel, and better performance.

SUMMARY

The disclosure provides a touch detection method, which is suitable for a touch display panel including touch sensing columns. The touch detection method include following steps. The touch sensing columns are grouped in a first order during a first frame. The touch sensing columns grouped in the first order are scanned for detecting a first touched column during the first frame. The touch sensing columns are grouped in a second order during a second frame. The second order is dynamically assigned according to the first touched column. The first touched column and adjacent columns next to the first touched column are grouped together in one group in the second order. The touch sensing columns grouped in the second order are scanned for detecting a second touched column during the second frame.

The disclosure also provides a touch detection method, which is suitable for a touch display panel including touch sensor pads. Adjacent K touch sensor pads of the touch sensor pads are merged along a horizontal direction into a plurality of first merged units. The first merged units are scanned for detecting a first coordinate of a touch event. Adjacent K touch sensor pads of the touch sensor pads are merged along a vertical direction into a plurality of second merged units. The second merged units are scanned for detecting a second coordinate of the touch event.

It is to be understood that both the foregoing general description and the following detailed description are demonstrated by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 4 is a schematic diagram illustrating scan data detected over different touch sensing columns during the first frame.

FIG. 5 is a schematic diagram illustrating scan data detected over different touch sensing columns during the second frame.

FIG. 6 is a schematic diagram illustrating scan data detected over different touch sensing columns during the third frame.

DETAILED DESCRIPTION

Figure 1:
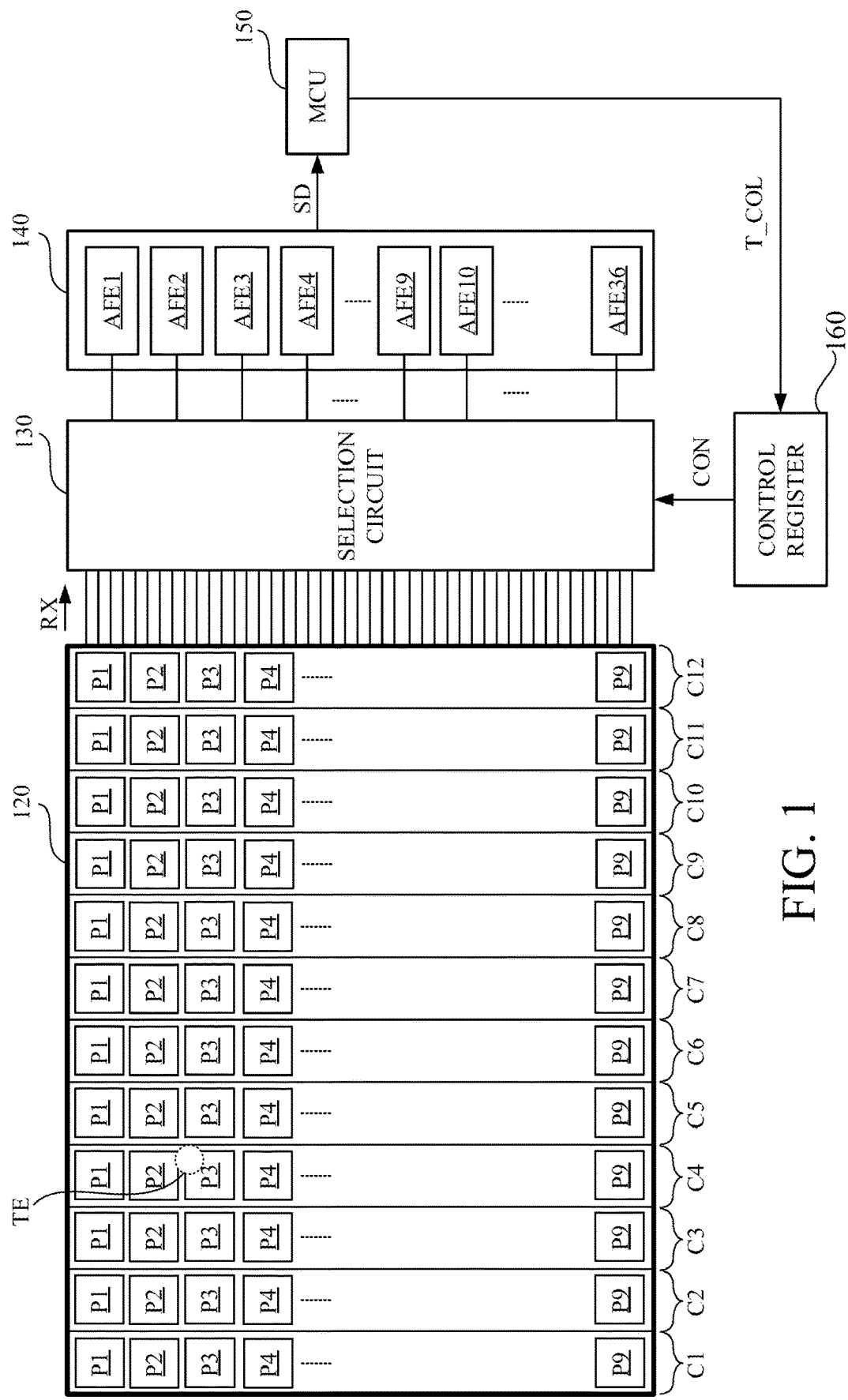
FIG. 1 is a schematic diagram illustrating an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an electronic device 100 according to an embodiment of the disclosure. The electronic device 100 includes a touch display panel 120, a selection circuit 130, a touch sensing converter 140 and a microcontroller unit (MCU) 150.

The touch display panel 120 includes several touch sensor pads arranged on several touch sensing columns, such as the touch sensing columns C1, C2, C3 . . . C12 as shown in FIG. 1. The touch sensor pads on the touch display panel 120 are individually arranged along rows and columns for sensing a touch event on the touch display panel 120. In the embodiment shown in FIG. 1, each of the touch sensing columns C1~C12 includes nine touch sensor pads P1, P2, P3 . . . P9. It is noticed that, amounts of the columns and rows shown in FIG. 1 are illustrated for demonstration. In practical applications, the touch display panel 120 includes touch sensor pads arranged on multiple rows and multiple columns, and not limited to nine rows and twelve columns. The touch display panel 120 may include M*N touch sensor pads arranged on M rows and N columns. M and N are positive integers.

The touch sensing converter 140 may include several analog front-end touch sensing units. In the embodiment shown in FIG. 1, the touch sensing converter 140 may include thirty-six analog front-end touch sensing units AFE1, AFE2, AFE3 . . . AFE36. It is noticed that, an amount of the front-end touch sensing units shown in FIG. 1 are illustrated for demonstration, and not limited to thirty-six.

The selection circuit 130 is coupled to each of the touch sensor pads P1~P9 on the touch sensing columns C1~C12. The touch sensor pads P1~P9 on the touch sensing columns C1~C12 are capable of generating touch sensing signals RX based on a touch event TE. For example, when the touch event TE is located around the touch sensor pad P3 on the touch sensing column C4, the touch sensing signals RX generated by neighboring touch sensor pads will has varying voltage levels, current levels or capacitance levels. The selection circuit 130 is coupled to each of the analog front-end touch sensing units AFE1~AFE36 of the touch sensing converter 140. In some embodiments, the selection circuit 130 is configured to select a part (e.g., 36 touch sensor pads) of the total 108 touch sensor pads and connect the part of the touch sensor pads (e.g., the selected 36 touch sensor pads) with the 36 analog front-end touch sensing units AFE1~AFE36 of the touch sensing converter 140. In some embodiments, the selection circuit 130 can be implemented by an analog multiplexer (AMUX).

The analog front-end touch sensing units AFE1 AFE36 of the touch sensing converter 140 are configured to receive touch sensing signals RX transmitted through the selection circuit 130 from the touch sensor pads P1~P9 on the touch sensing columns C1~C12. In some embodiments, each of the analog front-end touch sensing units AFE1 AFE36 may include a sensing amplifier to process the touch sensing signals RX (e.g., comparing the touch sensing signals RX with reference signals). In this case, the touch sensing converter 140 can generate scan data SD based on the touch sensing signals RX.

The microcontroller unit 150, connected with the touch sensing converter 140, is configured to receive the scan data SD from the touch sensing converter 140. In some embodiments, the microcontroller unit 150 is able to detect a touched column T_COL based on the scan data SD. The microcontroller unit 150 is also capable for calculating coordinates of the touch event TE based on the scan data SD.

Figure 2:
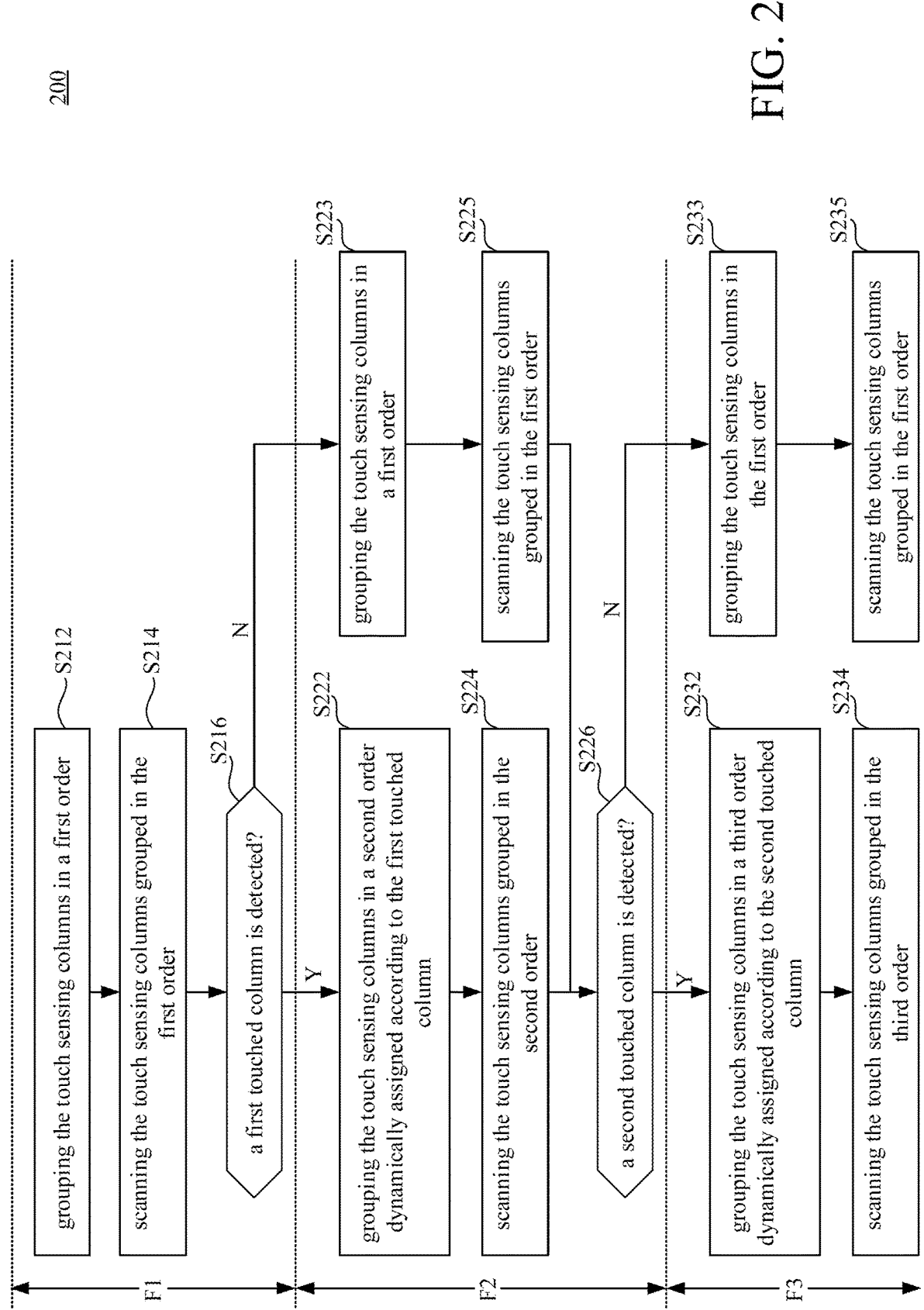
FIG. 2 is a flow chart illustrating a touch detection method according to some embodiments of the disclosure.
Figure 3:
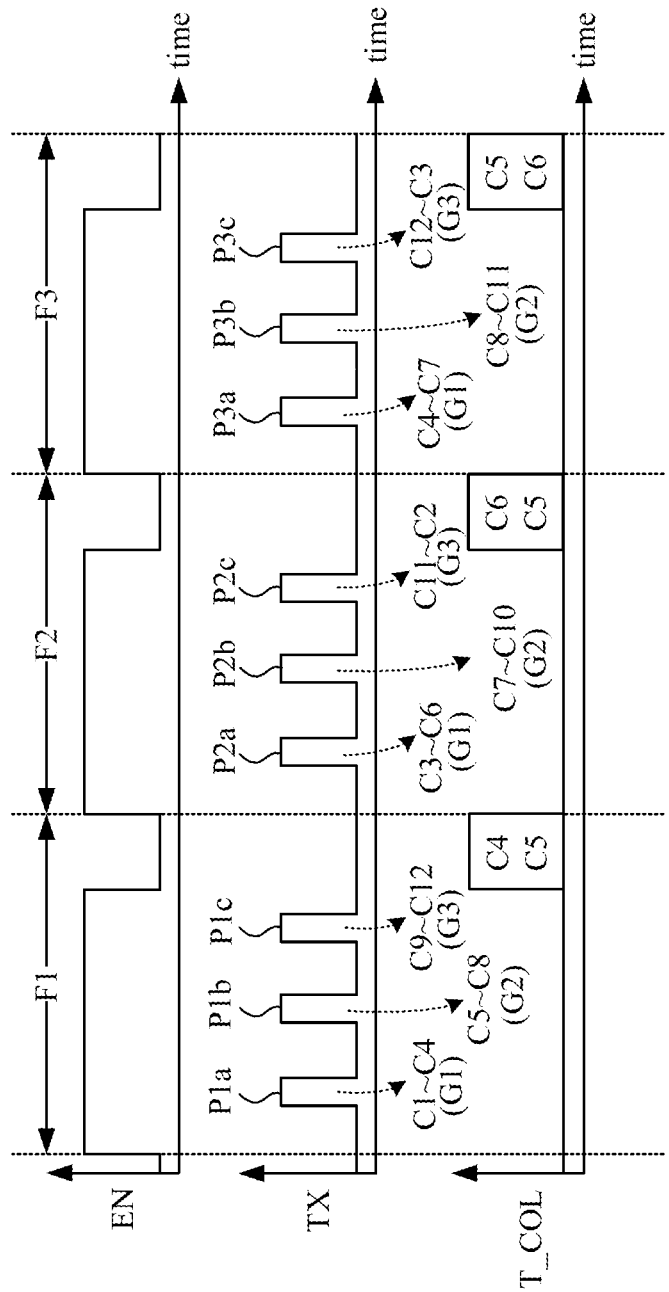
FIG. 3 is a signal waveform generated by the electronic device performing the touch detection method according to some embodiments of the disclosure.

Reference is further made to FIG. 2, FIG. 3 and FIG. 4. FIG. 2 is a flow chart illustrating a touch detection method 200 according to some embodiments of the disclosure. The touch detection method 200 can be performed by the electronic device 100 shown in FIG. 1. FIG. 3 is a signal waveform generated by the electronic device 100 performing the touch detection method 200 according to some embodiments of the disclosure. FIG. 4 is a schematic diagram illustrating scan data SD detected over different touch sensing columns C1~C12 during the first frame F1.

As shown in FIG. 1, FIG. 2, FIG. 3 and FIG. 4, during a first frame F1, step S212 is executed by the selection circuit 130 for grouping the touch sensing columns C1~C12 in a first order. In some embodiments, the first order is a default order for grouping the touch sensing columns C1~C12. Based on the first order (i.e., the default order), the touch sensing columns C1~C4 are classified as the first group G1; the touch sensing columns C5~C8 are classified as the second group G2; the touch sensing columns C9~C12 are classified as the third group G3.

During the first frame F1, step S214 is executed for scanning the touch sensing columns grouped in the first order for detecting a first touched column T_COL1 as shown in FIG. 4. During step S214, the analog front-end touch sensing units AFE1~AFE36 of the touch sensing converter 140 generate three pulses P1a, P1b and Plc (referring to FIG. 3) on a touch triggering signal TX during the first frame F1.

The first pulse P1a is transmitted from the analog front-end touch sensing units AFE1~AFE36 of the touch sensing converter 140 through the selection circuit 130 (e.g., AMUX) to the touch sensor pads P1~P9 on the touch sensing columns C1~C4 in the first group G1 of the first order. During the first pulse P1a in the first frame F1, the touch sensing columns C1~C4 in the first group G1 generate the touch sensing signals RX, and the touch sensing signals RX are transmitted through the selection circuit 130 to the front-end touch sensing units AFE1~AFE36.

The second pulse P1b is transmitted from the analog front-end touch sensing units AFE1~AFE36 of the touch sensing converter 140 through the selection circuit 130 (e.g., AMUX) to the touch sensor pads P1~P9 on the touch sensing columns C5~C8 in the second group G2 of the first order. During the second pulse P1b in the first frame F1, the touch sensing columns C5~C8 in the second group G2 generate the touch sensing signals RX, and the touch sensing signals RX are transmitted through the selection circuit 130 to the front-end touch sensing units AFE1~AFE36.

The third pulse Plc is transmitted from the analog front-end touch sensing units AFE1~AFE36 of the touch sensing converter 140 through the selection circuit 130 (e.g., AMUX) to the touch sensor pads P1~P9 on the touch sensing columns C9~C12 in the third group G3 of the first order. During the third pulse P1c in the first frame F1, the touch sensing columns C9~C12 in the third group G3 generate the touch sensing signals RX, and the touch sensing signals RX are transmitted through the selection circuit 130 to the front-end touch sensing units AFE1~AFE36.

As shown in FIG. 4, it is assumed that the scan data SD have the highest level on touch sensing column C4 and the second-highest level on touch sensing column C5. In some embodiments, the touch sensing columns C4 and C5 are detected as the first touched columns T_COL1 during the first frame F1.

Based on the scan data SD shown in FIG. 4, it can be understood that the touch event TE may be located a location around the touch sensing columns C4 and C5. It is noticed that, according to the first order utilized in the first frame F1, the touch sensing columns C4 and C5 are placed in different groups G1 and G2. In other words, the touch sensing signals RX collected from the touch sensing columns C4 is based on the first pulse P1a, the touch sensing signals RX collected from the touch sensing columns C5 is based on the second pulse P1b. As shown in FIG. 4, the first pulse P1a and the second pulse P1b are triggered on different time points. If a background noise level changes dramatically between time points of the first pulse P1a and the second pulse P1b, the scan data SD will be shifted or contaminated by the background noise.

It is desired that the touch event TE is detected based on the touch sensing signals RX collected at the same timing. Therefore, some embodiments of the disclosure provide a manner to dynamically change the grouping order of the detected touched columns in a previously frame.

Step S216 is executed, by the control register 160, to check if the first touched columns T_COL1 is detected during the first frame F1. In this case, because the first touched columns T_COL1 (i.e., the touch sensing columns C4 and C5) are detected in the first frame F1, the control register 160 will generate an order control signal CON to the selection circuit 130 (e.g., AMUX) to assign a second order based on the first touched columns T_COL1.

In the situation that the first touched columns T_COL1 (i.e., the touch sensing columns C4 and C5) are detected in the first frame F1, step S222 is executed by the selection circuit 130 for grouping the touch sensing columns C1~C12 in a second order during the second frame F2. Reference is also made to FIG. 5 is a schematic diagram illustrating scan data SD detected over different touch sensing columns C1~C12 during the second frame F2.

As shown in FIG. 1, FIG. 2, FIG. 3 and FIG. 5, during the second frame F2, step S222 is executed by the selection circuit 130 for grouping the touch sensing columns C1~C12 in the second order dynamically assigned according to the first touched column T_COL1. Based on the second order, the touch sensing columns C3~C6 are classified as the first group G1; the touch sensing columns C7~C10 are classified as the second group G2; the touch sensing columns C11, C12, C1 and C2 are classified as the third group G3.

In this case, the first touched column T_COL1 (i.e., the touch sensing columns C4 and C5) and adjacent columns (i.e., the touch sensing columns C3 and C7) next to the first touched column T_COL1 are grouped together in one group, i.e., the first group G1, in the second order.

In this case, the first touched column T_COL1 (i.e., the touch sensing columns C4 and C5) is located at a center of the first group G1 in the second order during the second frame F2.

During the second frame F2, step S224 is executed for scanning the touch sensing columns grouped in the second order for detecting a second touched column T_COL2 as shown in FIG. 5. During step S224, the analog front-end touch sensing units AFE1~AFE36 of the touch sensing converter 140 generate three pulses P2a, P2b and P2c (referring to FIG. 3) on the touch triggering signal TX during the second frame F2.

The first pulse P2a is transmitted from the analog front-end touch sensing units AFE1~AFE36 of the touch sensing converter 140 through the selection circuit 130 (e.g., AMUX) to the touch sensor pads P1~P9 on the touch sensing columns C3~C6 in the first group G1 of the second order. During the first pulse P2a in the second frame F2, the touch sensing columns C3~C6 in the first group G1 generate the touch sensing signals RX, and the touch sensing signals RX are transmitted through the selection circuit 130 to the front-end touch sensing units AFE1~AFE36.

Similarly, the second pulse P2b is transmitted to the touch sensing columns C7~C10 in the second group G2 of the second order. The third pulse P2c is transmitted to the touch sensing columns C11, C12, C1 and C2 in the third group G3 of the second order.

As shown in FIG. 5, it is assumed that the scan data SD have the highest level on touch sensing column C6 and the second-highest level on touch sensing column C5. In some embodiments, the touch sensing columns C6 and C5 are detected as the second touched columns T_COL2 during the second frame F2.

Based on the scan data SD shown in FIG. 5, it can be understood that the touch event TE may be located a location around the touch sensing columns C6 and C5. The second order utilized in the second frame F2 is a dynamic order based on the first touched column T_COL1 detected in the first frame F1.

It is noticed that, according to the second order utilized in the second frame F2, the touch sensing columns C6 and C5 are placed in the same group G1. In other words, the touch sensing signals RX collected from the touch sensing columns C6 and C5 are based on the same first pulse P1a. Even there is a background noise affecting the first pulse P1a, the scan data SD collected from the touch sensing columns C6 and C5 will be affected by the same level of the background noise at the same time point. In other words, it can avoid a gap between different background noise levels on different timings, the scan data SD collected in this manner may have more tolerance against the background noise.

In aforesaid embodiments, the first touched column T_COL1 is detected in the first frame F1 for demonstration. On the other hand, if no touched column is detected during the first frame F1, step S223 is executed by the selection circuit 130 for grouping the touch sensing columns C1~C12 in the first order (i.e., the default order) during the second frame F2. In this case, step S225 is executed for scanning the touch sensing columns C1~C12 grouped in the first order for detecting the second touched column during the second frame F2.

As the embodiment shown in FIG. 5, the second touched column T_COL2 by the microcontroller unit 150 is detected in the second frame F2. Step S226 is executed to check if the second touched column T_COL2 is detected in the second frame F2.

Similarly, because the second touched column T_COL2 (i.e., the touch sensing columns C6 and C5) are detected in the second frame F2, step S232 is executed by the selection circuit 130 for grouping the touch sensing columns C1~C12 in the third order dynamically assigned according to the second touched column T_COL2. FIG. 6 is a schematic diagram illustrating scan data SD detected over different touch sensing columns C1~C12 during the third frame F3.

Based on the third order, the touch sensing columns C4-C7 are classified as the first group G1; the touch sensing columns C8-C11 are classified as the second group G2; the touch sensing columns C12, C1, C2 and C3 are classified as the third group G3.

During the third frame F3, step S234 is executed for scanning the touch sensing columns grouped in the third order for detecting a third touched column T_COL3 as shown in FIG. 6. During step S234, the analog front-end touch sensing units AFE1~AFE36 of the touch sensing converter 140 generate three pulses P3a, P3b and P3c (referring to FIG. 3) on the touch triggering signal TX during the third frame F3.

The first pulse P3a is transmitted from the analog front-end touch sensing units AFE1~AFE36 of the touch sensing converter 140 through the selection circuit 130 (e.g., AMUX) to the touch sensor pads P1~P9 on the touch sensing columns C4~C7 in the first group G1 of the third order. During the first pulse P3a in the third frame F3, the touch sensing columns C4~C7 in the first group G1 generate the touch sensing signals RX, and the touch sensing signals RX are transmitted through the selection circuit 130 to the front-end touch sensing units AFE1~AFE36.

Similarly, the second pulse P3b is transmitted to the touch sensing columns C8~C11 in the second group G2 of the third order. The third pulse P3c is transmitted to the touch sensing columns C12, C1, C2 and C3 in the third group G3 of the third order.

In this case, the second touched column T_COL2 (i.e., the touch sensing columns C6 and C5) and adjacent columns (i.e., the touch sensing columns C7 and C4) next to the second touched column T_COL2 are grouped together in one group, i.e., the first group G1, in the third order.

In aforesaid embodiments, the second touched column T_COL2 is detected in the second frame F2 for demonstration. On the other hand, if no touched column is detected during the second frame F2, step S233 is executed by the selection circuit 130 for grouping the touch sensing columns C1~C12 in the first order (i.e., the default order) during the third frame F3. In this case, step S235 is executed for scanning the touch sensing columns C1~C12 grouped in the first order for detecting the third touched column during the third frame F3.

In aforesaid embodiments, the disclosure provides a touch detection method which dynamically change the grouping order between the touch sensing columns C1~C12 to avoid the background noise difference over time. However, the disclosure is not limited thereto. In another embodiment, the disclosure provides another manner to avoid the background noise difference over time.

Figure 7:
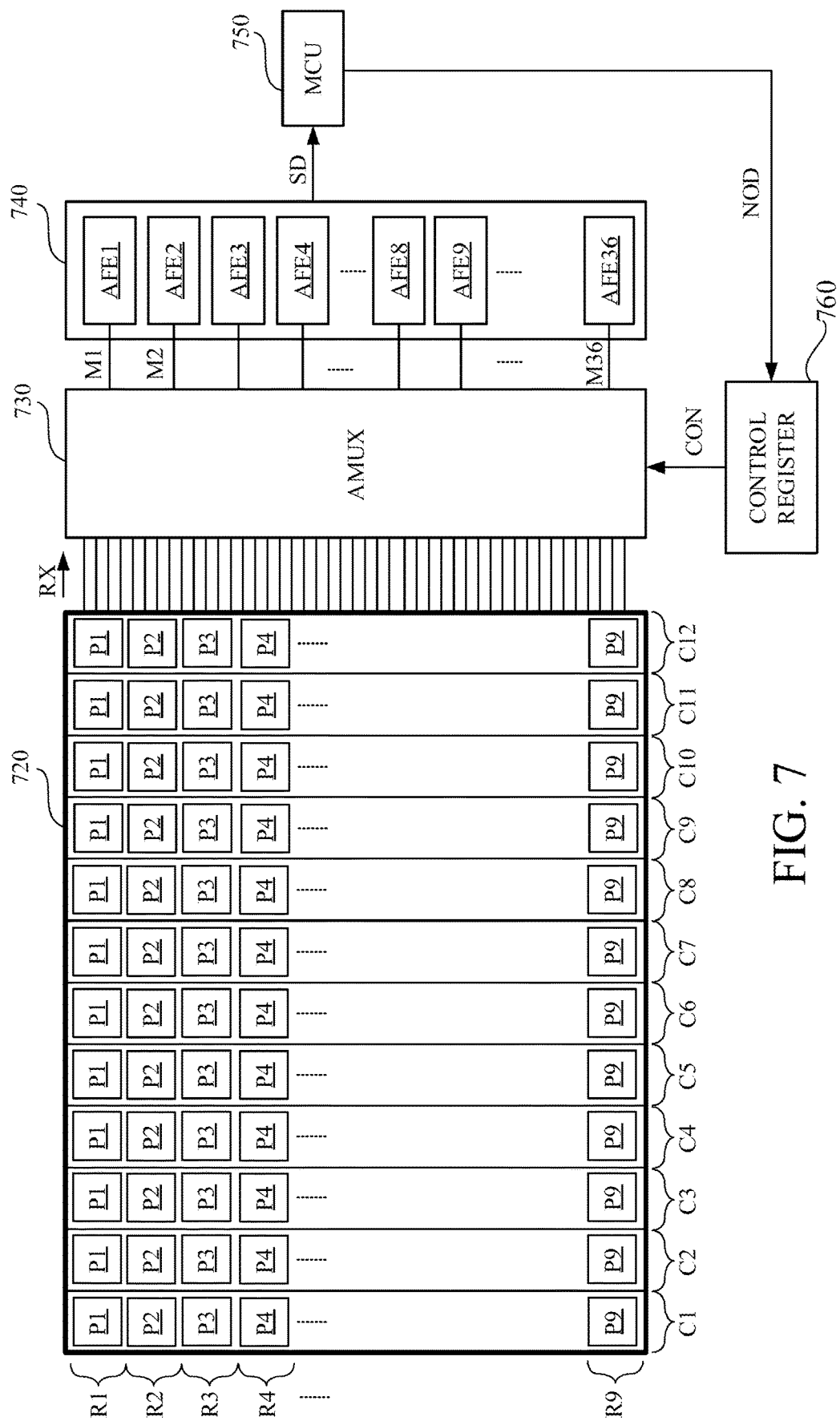
FIG. 7 is a schematic diagram illustrating an electronic device according to an embodiment of the disclosure.

Reference is made to FIG. 7, which is a schematic diagram illustrating an electronic device 700 according to an embodiment of the disclosure. The electronic device 700 includes a touch display panel 720, a selection circuit 730, a touch sensing converter 740 and a microcontroller unit (MCU) 750.

The touch display panel 720 includes several touch sensor pads arranged on several touch sensing columns C1, C2, C3 . . . C12 and several touch sensing rows R1, R2, R3 . . . R9 as shown in FIG. 7. The touch sensor pads on the touch display panel 720 are individually arranged along rows and columns for sensing a touch event on the touch display panel 720. In the embodiment shown in FIG. 7, each of the touch sensing columns C1~C12 includes nine touch sensor pads P1, P2, P3 . . . P9.

The behaviors and function of the touch panel 720, the selection circuit 730, the touch sensing converter 740 and the microcontroller unit 750 in FIG. 7 are similar to aforesaid embodiments about the touch display panel 120, the selection circuit 130, the touch sensing converter 140 and the microcontroller unit 150. A main difference is that, the microcontroller unit 750 is configured to detect a background noise according to the scan data SD. If the background noise is detected, the microcontroller unit 750 generates a noise detection signal NOD to the control register 760. The control register 760 will generate a control signal CON to the selection circuit 730 based on the noise detection signal NOD. Further details will be explained in following paragraphs.

Figure 8:
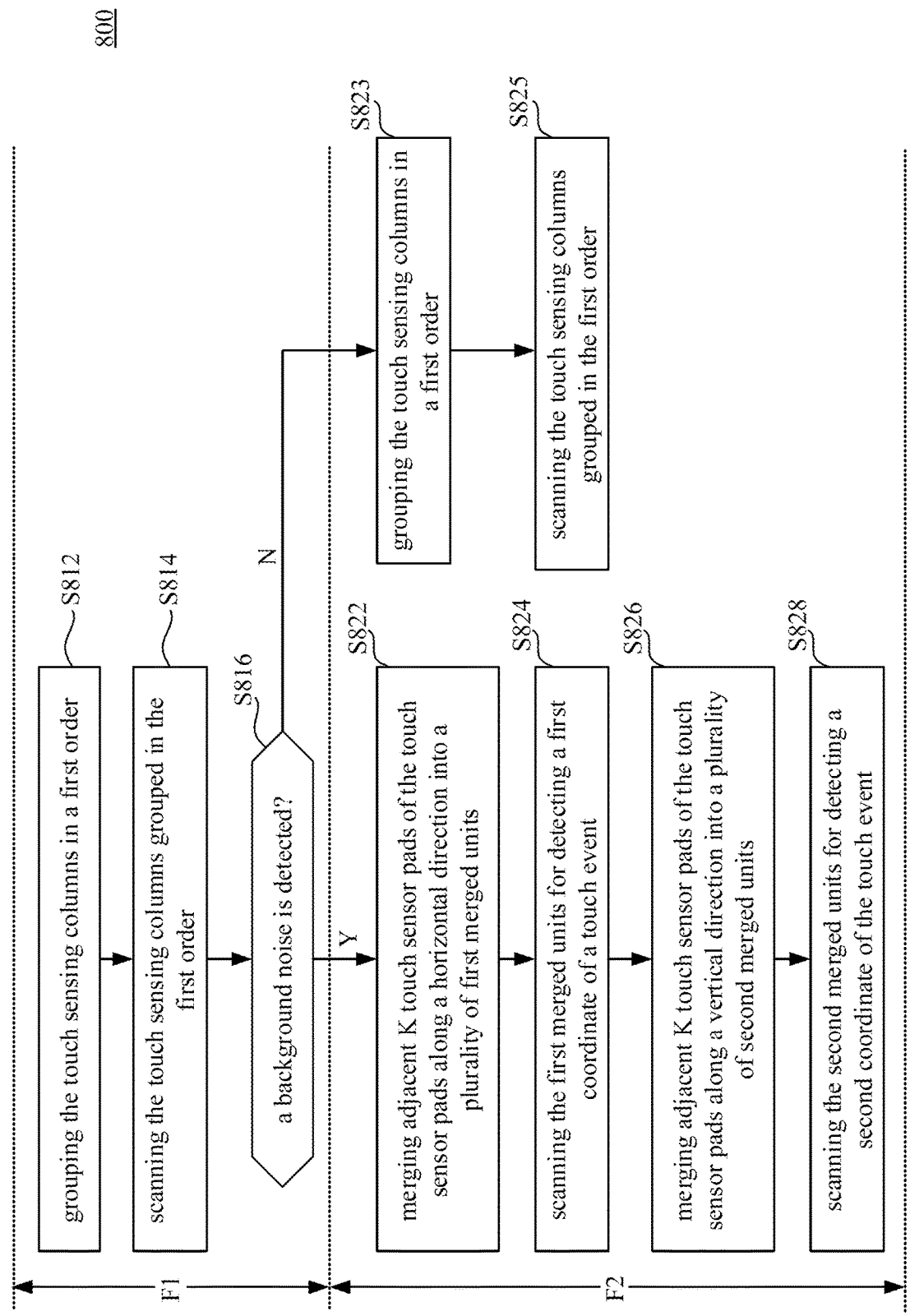
FIG. 8 is a flow chart illustrating a touch detection method according to some embodiments of the disclosure.
Figure 9:
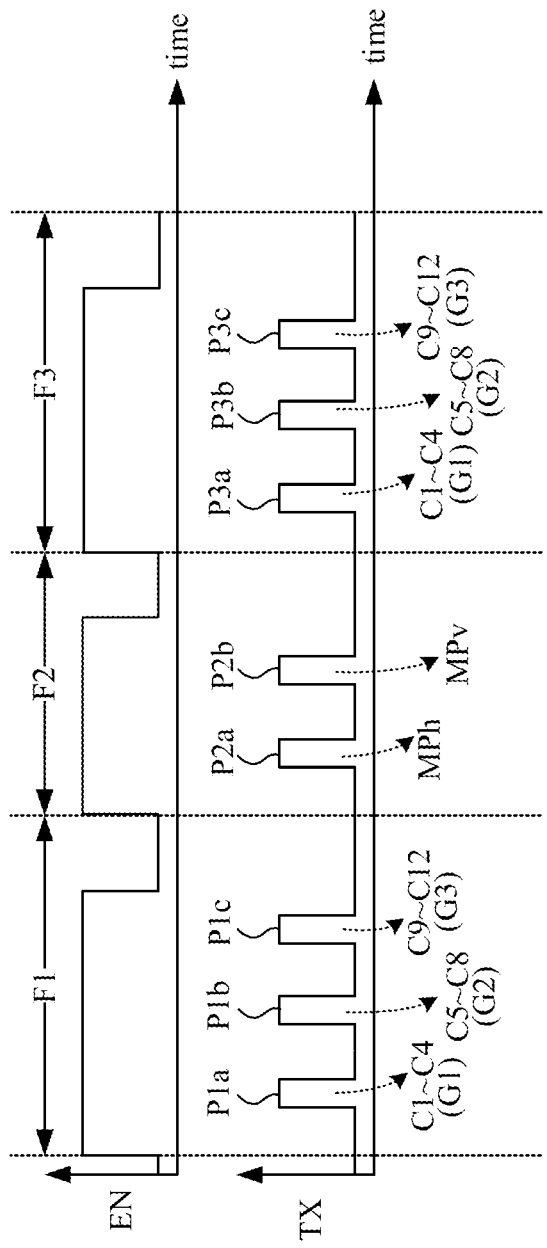
FIG. 9 is a signal waveform generated by the electronic device performing the touch detection method according to some embodiments of the disclosure.

Reference is further made to FIG. 8 and FIG. 9. FIG. 8 is a flow chart illustrating a touch detection method 800 according to some embodiments of the disclosure. FIG. 9 is a signal waveform generated by the electronic device 700 performing the touch detection method 800 according to some embodiments of the disclosure.

Steps S812 and S814 of the touch detection method 800 are executed during the first frame F1. Steps S812 and S814 of the touch detection method 800 similar to steps S212 and S214 of the touch detection method 200 discussed in aforesaid embodiments, and not repeated again.

During the first frame F1, step S816 is executed by the microcontroller unit 750 for detecting a background noise based on the scan data SD collected in the first frame F1. If the background noise is not detected in step S816, steps S823 and S825 will be executed during the second frame F2 (similar to steps S223 and S225 in aforesaid embodiments) in the touch detection method 800.

Figure 10:
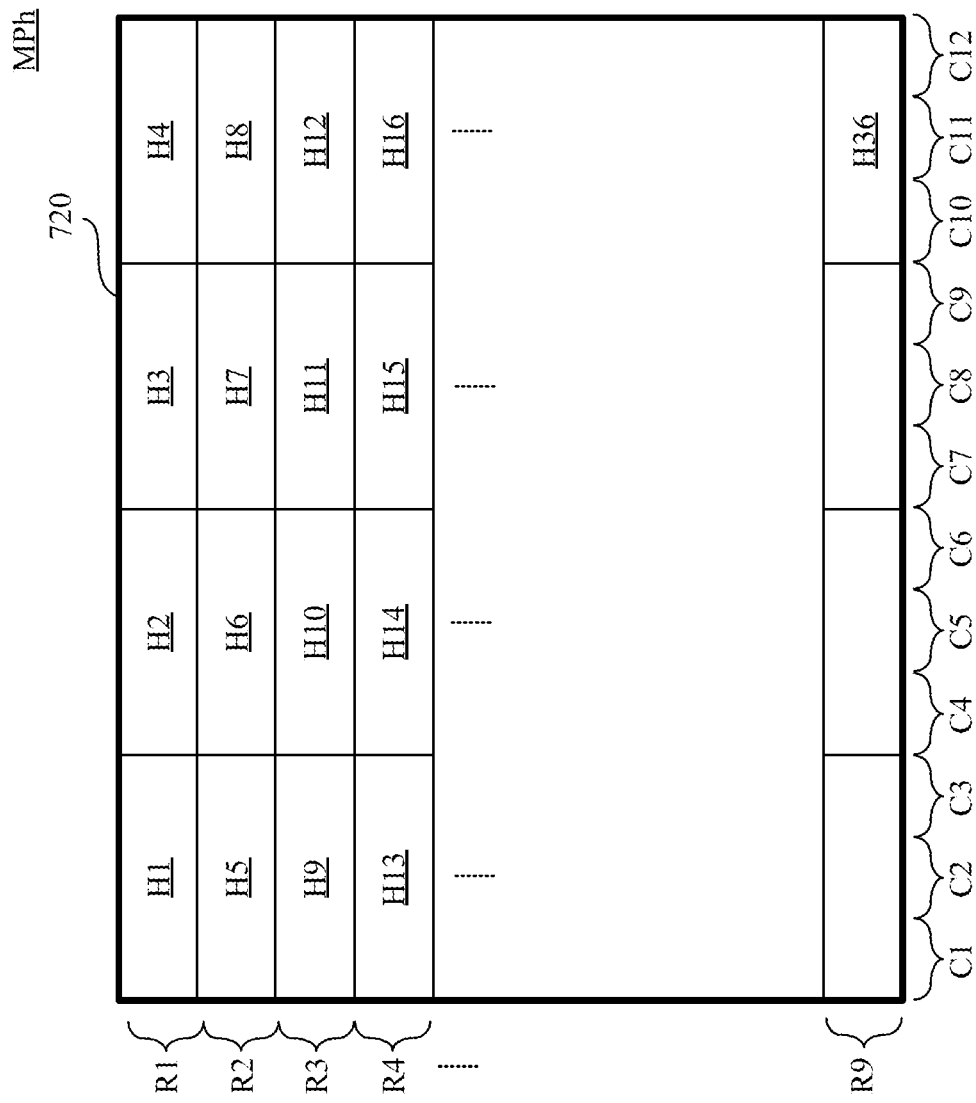
FIG. 10 is a schematic diagram illustrating a merged pattern along the horizontal direction in a step according to some embodiments.

On the other hand, if the background noise is detected in step S816, steps S822, S824, S826 and S828 are executed. Step S822 is executed, by the selection circuit 730, for merging adjacent K touch sensor pads of the touch sensor pads along a horizontal direction into first merged units. Reference is further made to FIG. 10, which is a schematic diagram illustrating a merged pattern MPh along the horizontal direction in step S822 according to some embodiments. As shown in FIG. 10, the merged pattern MPh includes the first merged units H1~H36 merged along the horizontal direction.

As shown in FIG. 7 and FIG. 10, the selection circuit 730 merges the touch sensor pads P1 on the touch sensing columns C1, C2 and C3 along the horizontal direction into a first merged unit H1; the selection circuit 730 merges the touch sensor pads P1 on the touch sensing columns C4, C5 and C6 along the horizontal direction into another first merged unit H2; the selection circuit 730 merges the touch sensor pads P1 on the touch sensing columns C7, C8 and C9 along the horizontal direction into another first merged unit H3; and so on.

As shown in FIG. 7 to FIG. 10, during the second frame F2, step S824 is executed for scanning the first merged units H1-H36 (referring to the merged pattern MPh in FIG. 10) for detecting a first coordinate of the touch event. During step S824, the analog front-end touch sensing units AFE1~AFE36 of the touch sensing converter 140 generate a pulse P2a (referring to FIG. 9) to the first merged units H1~H36 (referring to FIG. 10) on a touch triggering signal TX during the second frame F2. In this case, the scan data generated by the analog front-end touch sensing units AFE1~AFE36 can be used to detect a row coordinate of the touch event.

The selection circuit 730 is configured to merge three touch sensing signals RX from the first merged unit H1 (i.e., the touch sensor pads P1 on the touch sensing columns C1, C2 and C3) into a merged signal M1 and transmit the merged signal M1 to the analog front-end touch sensing unit AFE1 of the touch sensing converter 740. Similarly, as shown in FIG. 7 and FIG. 10, the selection circuit 730 is configured to merge three touch sensing signals RX from the first merged unit H2 (i.e., the touch sensor pads P1 on the touch sensing columns C4, C5 and C6) into a merged signal M2 and transmit the merged signal M2 to the analog front-end touch sensing unit AFE2 of the touch sensing converter 740. Similarly, as shown in FIG. 7 and FIG. 10, the selection circuit 730 is configured to merge three touch sensing signals RX from the first merged unit H36 (i.e., the touch sensor pads P9 on the touch sensing columns C10, C11 and C12) into a merged signal M36 and transmit the merged signal M36 to the analog front-end touch sensing unit AFE36 of the touch sensing converter 740.

In this case, as shown in FIG. 9 and FIG. 10, the first coordinate (i.e., the row coordinate) of the touch event is detected by the first merged units H1 H36 over the whole touch panel 720 in response to the pulse P2a. In other words, the first merged units H1~H36 over the whole touch display panel 720 are triggered at the same timing by the pulse P2a to calculate the row coordinate of the touch event. It can avoid a gap between different background noise levels on different timings.

Figure 11:
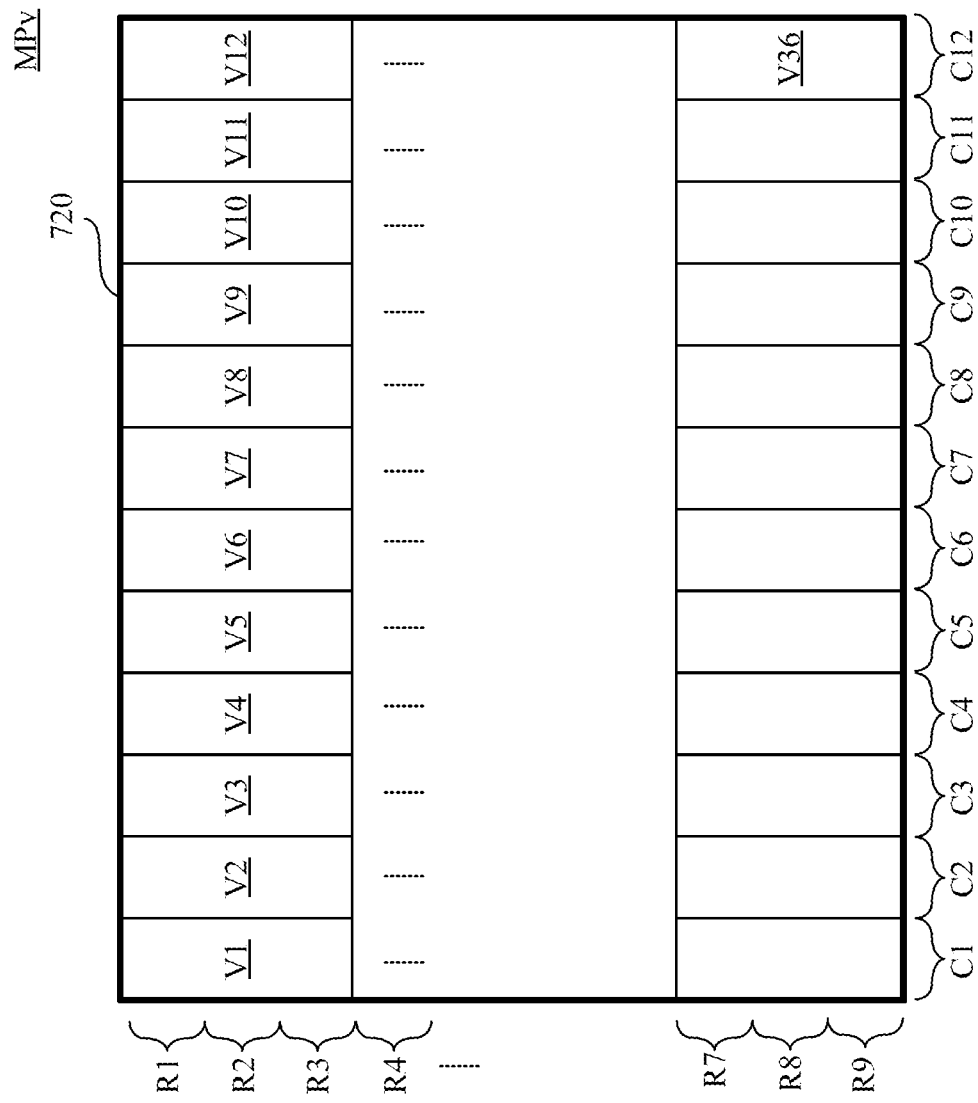
FIG. 11 is a schematic diagram illustrating another merged pattern along the vertical direction in another step according to some embodiments.

Step S826 is executed, by the selection circuit 730, for merging adjacent K touch sensor pads of the touch sensor pads along a vertical direction into second merged units. Reference is further made to FIG. 11, which is a schematic diagram illustrating a merged pattern MPv along the vertical direction in step S826 according to some embodiments. As shown in FIG. 11, the merged pattern MPv includes the second merged units V1~V36 merged along the vertical direction.

As shown in FIG. 7 and FIG. 11, the selection circuit 730 merges the touch sensor pads P1, P2 and P3 on the touch sensing column C1 along the vertical direction into a second merged unit V1; the selection circuit 730 merges the touch sensor pads P1, P2 and P3 on the touch sensing column C2 along the vertical direction into another second merged unit V2; the selection circuit 730 merges the touch sensor pads P1, P2 and P3 on the touch sensing column C3 along the vertical direction into another second merged unit V3; and so on.

As shown in FIG. 7 to FIG. 11, during the second frame F2, step S828 is executed for scanning the second merged units V1~V36 (referring to the merged pattern MPv in FIG. 11) for detecting a second coordinate of the touch event.

During step S828, the analog front-end touch sensing units AFE1~AFE36 of the touch sensing converter 140 generate another pulse P2b (referring to FIG. 9) to the second merged units V1~V36 (referring to FIG. 11) on the touch triggering signal TX during the second frame F2. In this case, the scan data generated by the analog front-end touch sensing units AFE1~AFE36 can be used to detect a column coordinate of the touch event.

The selection circuit 730 is configured to merge three touch sensing signals RX from the second merged unit V1 into a merged signal M1 and transmit the merged signal M1 to the analog front-end touch sensing unit AFE1 of the touch sensing converter 740. Similarly, as shown in FIG. 7 and FIG. 11, the selection circuit 730 is configured to merge three touch sensing signals RX from the second merged unit V2 into a merged signal M2 and transmit the merged signal M2 to the analog front-end touch sensing unit AFE2 of the touch sensing converter 740. Similarly, as shown in FIG. 7 and FIG. 11, the selection circuit 730 is configured to merge three touch sensing signals RX from the second merged unit V36 into a merged signal M36 and transmit the merged signal M36 to the analog front-end touch sensing unit AFE36 of the touch sensing converter 740.

In this case, as shown in FIG. 9 and FIG. 11, the second coordinate (i.e., the column coordinate) of the touch event is detected by the second merged units V1~V36 over the whole touch display panel 720 in response to the pulse P2b. In other words, the second merged units V1~V36 over the whole touch display panel 720 are triggered at the same timing by the pulse P2b to calculate the column coordinate of the touch event. It can avoid a gap between different background noise levels on different timings.

The first coordinate (i.e., the row coordinate) detected in step S824 and the second coordinate (i.e., the column coordinate) detected in step S828 are combined to allocate X/Y coordinates of the touch event. In this case, the touch detection method 800 is able to avoid the gap between different background noise levels and also maintain a preciseness of the touch detection.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch detection method, suitable for a touch display panel having a plurality of touch sensing columns, the touch detection method comprising:
grouping the touch sensing columns in a first order during a first frame;
scanning the touch sensing columns grouped in the first order for detecting a first touched column during the first frame, wherein scan data are generated during the first frame to have different levels corresponding to each of the touch sensing columns separately;
grouping the touch sensing columns in a second order during a second frame, wherein the second order is assigned according to the first touched column, and the first touched column and adjacent columns next to the first touched column are grouped together in one group in the second order; and
scanning the touch sensing columns grouped in the second order for detecting a second touched column during the second frame, wherein scan data are generated during the second frame to have different levels corresponding to each of the touch sensing columns separately without deactivating some of the touch sensing columns.

2. The touch detection method according to claim 1, further comprising:
grouping the touch sensing columns in a third order during a third frame, wherein the third order is assigned according to the second touched column, and the second touched column and adjacent columns next to the second touched column are grouped together in one group in the third order; and
scanning the touch sensing columns grouped in the third order for detecting a third touched column during the third frame.

3. The touch detection method according to claim 1, wherein the touch detection method further comprises:
in response to that no touched column is detected during the first frame, grouping the touch sensing columns in the first order during the second frame; and
in response to that no touched column is detected during the first frame, scanning the touch sensing columns grouped in the first order for detecting the second touched column during the second frame.

4. The touch detection method according to claim 1, wherein the first order is a default order for grouping the touch sensing columns.

5. The touch detection method according to claim 1, wherein the second order is based on the first touched column for grouping the touch sensing columns.

6. The touch detection method according to claim 1, wherein the first touched column is arranged around a center of the one group in the second order.

7. The touch detection method according to claim 1, wherein the touch sensing columns are grouped by a selection circuit, the selection circuit is coupled between the touch sensing columns and a touch sensing converter, and the touch sensing converter is configured to receive touch sensing signals transmitted through the selection circuit from the touch sensing columns.

8. The touch detection method according to claim 7, wherein the touch sensing columns comprising a plurality of touch sensor pads, the selection circuit is coupled to each of the touch sensor pads, the touch sensing converter comprises a plurality of analog front-end touch sensing units, the selection circuit is configured to select a part of the touch sensor pads and connect the part of the touch sensor pads with the analog front-end touch sensing units.

9. A touch detection method, suitable for a touch display panel having a plurality of touch sensor pads, the touch detection method comprising:
merging adjacent K touch sensor pads of the touch sensor pads along a horizontal direction into a plurality of first merged units, wherein K touch sensing signals from the adjacent K touch sensor pads along the horizontal direction are merged into a merged signal as one touch sensing unit for detecting a touch event;
scanning the first merged units for detecting a first coordinate of the touch event;
merging adjacent K touch sensor pads of the touch sensor pads along a vertical direction into a plurality of second merged units, wherein other K touch sensing signals from the adjacent K touch sensor pads along the vertical direction are merged into another merged signal as another one touch sensing unit for detecting the touch event; and scanning the second merged units for detecting a second coordinate of the touch event.

10. The touch detection method according to claim 9, wherein the first coordinate and the second coordinate are combined to allocate the touch event.

11. The touch detection method according to claim 9, wherein the touch sensor pads are arranged on a plurality of touch sensing columns, the touch detection method further comprises:

grouping the touch sensing columns in a first order during a first frame;

scanning the touch sensing columns grouped in the first order during the first frame; and detecting a background noise based on scan data collected during the first frame.

12. The touch detection method according to claim 11, comprising:

in response to the background noise is detected, merging adjacent K touch sensor pads of the touch sensor pads along the horizontal direction into the first merged units during a second frame;

in response to the background noise is detected, scanning the first merged units for detecting the first coordinate of the touch event during the second frame;

in response to the background noise is detected, merging adjacent K touch sensor pads of the touch sensor pads along the vertical direction into the second merged units during the second frame; and in response to the background noise is detected, scanning the second merged units for detecting the second coordinate of the touch event during the second frame.

13. The touch detection method according to claim 11, comprising:

in response to the background noise is not detected, grouping the touch sensing columns in the first order during a second frame; and in response to the background noise is not detected, scanning the touch sensing columns grouped in the first order during the second frame.

14. The touch detection method according to claim 9, wherein a selection circuit is coupled between the touch sensor pads and a touch sensing converter, the touch sensing converter comprises a plurality of analog front-end touch sensing units, and the touch sensing converter is configured to receive touch sensing signals from the touch sensor pads.

15. The touch detection method according to claim 14, wherein the selection circuit is configured to merge the K touch sensing signals from the adjacent K touch sensor pads along the horizontal direction into the merged signal and transmit the merged signal to one analog front-end touch sensing unit of the touch sensing converter.

* * * * *